Nov. 29, 1949   F. M. PEARSALL, JR   2,489,926
PULSING CIRCUIT
Filed Dec. 23, 1947

INVENTOR
F.M. PEARSALL, JR.
BY
ATTORNEY

Patented Nov. 29, 1949

2,489,926

UNITED STATES PATENT OFFICE 2,489,926

PULSING CIRCUIT

Frank M. Pearsall, Jr., Merrick, N. Y., assignor to Bell Telephone Laboratories, Incorporated, New York, N. Y., a corporation of New York Application December 23, 1947, Serial No. 793,486

9 Claims. (Cl. 171—97)

This invention relates to pulsing apparatus, and more particularly to pulsing circuits wherein the pulsing apparatus responds to and creates certain electrical conditions at a rate corresponding to predetermined cycles of a source of alternating current.

The usual means for generating a pulsing current utilizes an electronic device under the control of a timing network or a tuned network. An object of this invention is to provide a simplified and inexpensive means for generating pulses of electric current wherein the frequency of the pulses is a fractional part of the frequency of a source of alternating current. Other objects and advantages of the invention will be apparent from a consideration of the detailed description which follows taken in conjunction with the appended drawings, wherein.

Figure 1:
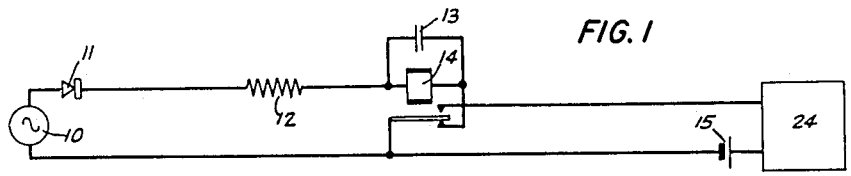
Fig. 1 is the basic circuit diagram of the invention.

The basic circuit of the invention shown in Fig. 1 comprises a control network and a pulsing network. The control network comprises relay 14 which is controlled by the current supplied by source of alternating current 10, the current being transmitted to the winding of the relay through unilateral cell 11 the timing network made up of resistor 12 and condenser 13, and the armature and outer contact of relay 14. The pulsing network comprises the armature and inner contact of relay 14, battery 15, and load 24 to which the pulsing current is supplied.

Initially relay 14 is unoperated and its armature is connected to its outer contact, thereby completing an electrical path through which the winding of relay 14 may be energized. The use of unilateral cell 11 in series with source of alternating current 10 permits only half-cycles of voltage to be applied to the control network, and the current which passes through the winding of relay 14 as a result of these half-cycles of voltage is controlled by the timing network and by the operation of the armature of the relay. When the first half-cycle of voltage is presented to the control network through unilateral cell 11, the current which results passes through timing resistor 12 and then divides, part serving to charge condenser 13 and part passing through the winding of relay 14. The circuit components are proportioned so that the flow of current through the relay winding is so controlled that the armature does not operate until approximately 90 per cent of the time required for the first half-cycle of impressed voltage has elapsed. As soon as the armature operates, the flow of current from source 10 is interrupted, condenser 13 ceases to charge and begins to discharge through the winding of the relay, and an electrical path is completed which applies the potential of battery 15 to load 24. It will be observed that the discharge path of condenser 13 is confined to the winding of the relay since the unilateral cell is poled so as to offer a high impedance to the current so discharged. The capacitance of the condenser is proportioned to the other circuit components so that the discharge current is sufficient to hold the armature in its operated position during the remainder of the time that the first half-cycle of voltage is presented, during the time when no voltage is presented to the circuit through unilateral cell 11, and until the time required for the second half-cycle of voltage has terminated. As soon as the time required for the second half-cycle of voltage has terminated the armature is released, thereby connecting the relay winding to source of alternating current 10 and breaking the circuit which was applying the potential of battery 15 to load 24. As the third half-cycle of voltage is presented to the control network, the relay again operates as before, and the relay is again held operated by the discharge current of the condenser so that the relay does not release until the time required for the fourth half-cycle of voltage has terminated. Thus, the potential of battery 15 is applied to load 24 during every second half-cycle of voltage as presented to the control circuit by unilateral cell 11. It is apparent that every second half-cycle of voltage as presented to the control circuit by unilateral cell 11 corresponds to every second cycle of voltage as presented to the control circuit by source 10. Therefore, the frequency of the electrical pulses transmitted to load 24 is one-half the frequency of the source of alternating current.

Figure 2:
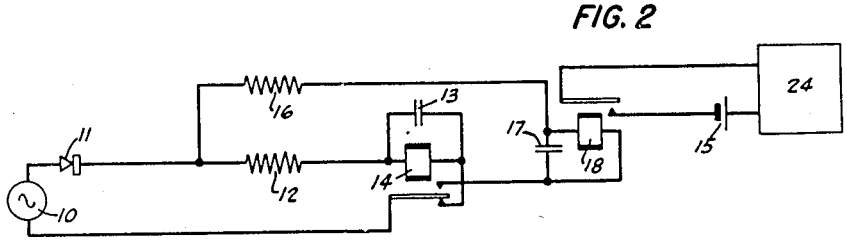
Fig. 2 is a modification of the basic circuit permitting the isolation of the pulsing contacts and the control apparatus.

The modification of the basic circuit indicated in Fig. 2 also permits the generation of electrical pulses which are one-half the frequency of the source of alternating current. In addition, the modified circuit permits the isolation of the pulsing contacts from the control apparatus.

This modified circuit comprises a control network and a pulsing network similar to those incorporated in the basic circuit, and, in addition, the modified circuit contains a second relay which controls the pulsing contacts.

As before, control relay 14 operates when approximately 90 per cent of the time required for the first half-cycle of impressed voltage has elapsed, and its armature transfers from the outer to the inner contact at that time, thereby completing an electrical path which connects the winding of relay 18 to source 10. The circuit components are proportioned so that the current applied to the winding of relay 18 during the remainder of the first half-cycle of voltage is insufficient to operate the relay. The armature of relay 14 remains operated during the second half-cycle of voltage as before, and this second half-cycle of voltage is connected to relay 18 and condenser 17 through resistor 16 and the operated armature of relay 14. The circuit components are proportioned so that relay 18 operates during the second half-cycle of voltage. The operation of relay 18 serves to complete an electrical circuit which applies the potential of battery 15 to load 24 as before. When the time required for the second half-cycle of current elapses, relay 14 releases its armature, and the winding of relay 18 is thereby disconnected from source 10. The value of condenser 17 is proportioned to the other circuit components so that the armature of relay 18 is held operated for a predetermined length of time, the time being limited only by the fact that the armature of relay 18 must be restored before the next half-cycle of voltage is impressed upon the winding of relay 18 through the contacts of relay 14. Resistance 16 also serves as a current limiter, thereby minimizing changes in the resistance of the relay winding due to the operating current. The third half-cycle of voltage again causes relay 14 to operate and the fourth half-cycle again causes relay 18 to operate. Thus, the potential of battery 15 is applied to load 24 during every second cycle of the voltage generated by the source.

Figure 3:
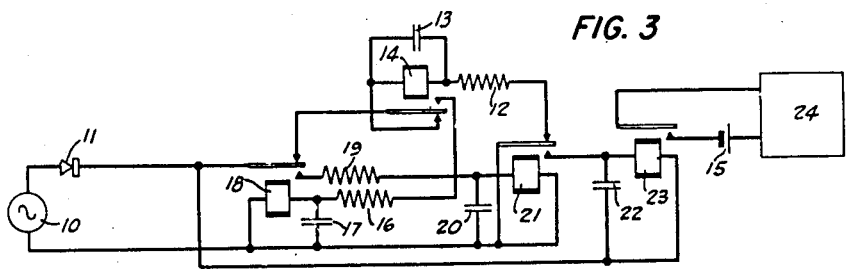
Fig. 3 is an extension of the modified circuit.

The extension of the modified circuit indicated in Fig. 3 permits the generation of electrical pulses which are one-fourth the frequency of the source of alternating current.

This extension of the modified circuit comprises two relays and timing circuits similar to those incorporated in the modified circuit and two additional relays which serve to close the pulsing contacts during each fourth half-cycle of voltage as presented to the circuit through the unilateral cell.

Initially all the relay armatures are released and the winding of relay 14 is connected to source of alternating current 10 through the released armatures of relays 14 and 18 and unilateral cell 11, and through resistor 12 and the released armature of relay 21. Control relay 14 operates when approximately 90 per cent of the time required for the first half-cycle of impressed voltage has elapsed as before, and its armature transfers from the outer to the inner contact at that time, thereby breaking the connection between the winding of relay 14 and unilateral cell 11 and completing an electrical path which connects the winding of relay 18 to unilateral cell 11 through resistor 16, the operated armature of relay 14, and the released armature of relay 18. Relay 18 operates when approximately 90 per cent of the time required for the second half-cycle of impressed voltage has elapsed. The operation of the armature of relay 18 breaks the connection between the unilateral cell 11 and the armature of relay 14 and completes an electrical path which connects the winding of relay 21 to source of alternating current 10 through resistor 19, the operated armature of relay 18, and unilateral cell 11. The circuit components are proportioned so that the current applied to the winding of relay 21 during the remainder of the second half-cycle of voltage is insufficient to operate the relay and so that relay 21 operates when approximately 90 per cent of the time required for the third half-cycle of impressed voltage has elapsed. The operation of relay 21 breaks the connection between resistor 12 and source 10 and completes an electrical path which connects the winding of relay 23 to source of alternating current 10. The circuit components are proportioned so that the current applied to the winding of relay 23 during the remainder of the third half-cycle of voltage is insufficient to operate the relay and so that relay 23 operates during the fourth half-cycle of voltage. The operation of relay 23 serves to complete an electrical circuit which applies the potential of battery 15 to load 24. The capacitance of condensers 13, 17 and 20 is of such magnitude that the current discharged by the condensers through the windings of relays 14, 18 and 21 when each of the relays operate is sufficient to hold each respective relay operated during the remaining part of the half-cycle of voltage which caused the relay to operate and until the time required for the succeeding half-cycle of voltage as presented to the circuit by unilateral cell 11 terminates. The value of condenser 22 is proportioned to the other circuit components so that the armature of relay 23 is held operated for a predetermined length of time, the timing being limited only by the fact that the armature of relay 23 must be restored before the next half-cycle of voltage is impressed upon the winding of relay 23 through the contacts of relay 21. It will be observed that the armature of relay 14 is released after the second half-cycle of voltage has been presented by unilateral cell 11, but this relay does not operate again until the fifth half-cycle since the armatures of relays 18 and 21 must be released before the winding of relay 14 can be energized by source 10. Also, it will be observed that the armature of relay 18 is released after the third half-cycle of voltage has been presented by unilateral cell 11, but this relay does not operate again until the sixth half-cycle since the armature of relay 14 must be operated before the winding of relay 18 can be energized by source 10. Thus, the armature of relay 14 is operated during the first and second half-cycles of voltage as presented to the circuit by unilateral cell 11, the armature of relay 18 is operated during the second and third half-cycles, the armature of relay 21 is operated during the third and fourth half-cycles, the armature of relay 23 is operated during the fourth and fifth half-cycles, and the armature of relay 14 again operates on the fifth half-cycle thereby permitting the sequence of operations to be continued. Therefore, it is apparent that the potential of battery 15 is applied to load 24 during every fourth cycle of the voltage generated by the source.

It will be observed that the ratio of the operated time to the unoperated time for the output relay of each circuit disclosed may be changed within certain limits by changing the capacitance of the condenser shunting the relay or by changing the impedance of the relay winding.

One application of the pulsing circuits disclosed in this invention is as pulse generators for testing electrical apparatus which requires pulses of 30 or 15 cycles per second. This situation permits the use of the pulsing circuits in conjunction with a 60-cycle per second source of alternating current. Since rapid and chatter-free operation is required of the relay armatures in such a situation, it is desirable to use mercury contact relays.

The apparatus disclosed in this invention is adapted to operate in combination with sources of current alternating at other frequencies and to periodically apply other conditions than electrical pulses to load 24. For example, battery 15 could be replaced with a conductor, an impedance, or other suitable circuit components. Also, load 24 may be any item of apparatus which is responsive to electrical conditions.

It is apparent that the invention disclosed herein may be extended so as to generate electrical pulses whose frequency bears a different fractional ratio to the frequency of the source than those disclosed hereinabove. Although specific embodiments of this invention have been shown and described, it will be understood that modifications may be made therein without departing from the scope and spirit thereof as defined by the following claims.

What is claimed is:

1. A pulsing circuit comprising a source of alternating current, means adapted to pass pulses of current corresponding to half-cycles of one polarity of said alternating current, a current-responsive device adapted to respond to said pulses of current, and an electrical network connected to said current-responsive device, the response and release of said current-responsive device being timed by said electrical network so that said current-responsive device responds to predetermined half-cycles of said pulses of current.

2. An electrical circuit comprising a source of alternating current, means adapted to pass pulses of current corresponding to half-cycles of one polarity of said alternating current, a first current-responsive device adapted to respond to said pulses of current, an electrical network connected to said first current-responsive device and adapted to time the response and release of said first current-responsive device, a second current responsive device, an electrical network connected to said second current-responsive device and adapted to time the response and release of said second current-responsive device, and means including said first current-responsive device and said half-cycles of current for energizing said second current-responsive device, the response of said second current-responsive device being controlled by predetermined half-cycles of said pulses of current and adapted to create predetermined electrical conditions.

3. An electrical circuit comprising a source of alternating current, means adapted to pass pulses of current corresponding to half-cycles of one polarity of said alternating current, a plurality of current-responsive devices, a timing network associated with each of said current-responsive devices, and means including said timing networks adapted to energize said current-responsive devices in a progressive manner, thereby limiting the response of one of said current-responsive devices to predetermined half-cycles of said pulses of current and permitting said one of said current-responsive devices to create predetermined electrical conditions in a periodical manner.

4. A pulsing circuit comprising a source of alternating current, means adapted to pass pulses of current corresponding to half-cycles of one polarity of said alternating current, a current-responsive device adapted to respond to said pulses of current, and means associated with said current-responsive device timing the response and release of said current-responsive device whereby said current-responsive device responds to predetermined ones of said pulses of current.

5. An electrical circuit comprising a source of alternating current, means adapted to pass pulses of current corresponding to half-cycles of one polarity of said alternating current, a first current-responsive device adapted to respond to said pulses of current, a second current-responsive device, means associated with each of said current-responsive devices adapted to time the response and release of each of said current-responsive devices, and means including said first current-responsive device and said pulses of current for energizing said second current-responsive device, the response of said second current-responsive device being controlled by predetermined ones of said pulses of current and adapted to create predetermined electrical conditions.

6. An electrical circuit comprising a source of alternating current, means adapted to pass pulses of current corresponding to half-cycles of one polarity of said alternating current, a plurality of current-responsive devices, means including means associated with each of said current-responsive devices adapted to energize said current-responsive devices in a progressive manner, thereby limiting the response of one of said current-responsive devices to predetermined ones of said pulses of current and permitting said one of said current-responsive devices to create predetermined electrical conditions in a periodical manner.

7. A pulsing circuit comprising a source of alternating current, an asymmetric conductor adapted to pass pulses of current corresponding to half-cycles of one polarity of said alternating current, a current-responsive device adapted to respond to said pulses of current, and an electrical network connected to said current-responsive device timing the response and release of said current-responsive device whereby said current-responsive device responds to every second pulse of said half-cycles of current.

8. An electrical circuit comprising a source of alternating current, an asymmetric conductor adapted to pass pulses of current corresponding to half-cycles of one polarity of said alternating current, a first current-responsive device adapted to respond to said pulses of current, a second current-responsive device, means associated with each of said current-responsive devices adapted to time the response and release of each of said current-responsive devices, and means including said first current-responsive device and said pulses of current for energizing said second current-responsive device every second pulse of said half-cycles of current.

9. An electrical circuit comprising a source of alternating current, an asymmetric conductor adapted to pass pulses of current corresponding to half-cycles of one polarity of said alternating current, a plurality of current-responsive devices, a timing network associated with each of said current-responsive devices, and means including said timing networks adapted to energize said current-responsive devices in a progressive manner, thereby limiting the response of one of said current-responsive devices to every fourth one of said pulses and permitting said one of said current-responsive devices to create predetermined electrical conditions in a periodical manner.

FRANK M. PEARSALL, JR.

REFERENCES CITED

The following references are of record in the file of this patent:

UNITED STATES PATENTS

| Number | Name | Date |
| --- | --- | --- |
| 1,271,732 | Leich | July 9, 1918 |
| 1,646,662 | Roe | Oct. 25, 1927 |
| 1,854,863 | Roe | Apr. 19, 1932 |